US005781940A

United States Patent [19]
Becker et al.

[11] Patent Number: 5,781,940
[45] Date of Patent: Jul. 21, 1998

[54] PORTABLE, COLLAPSIBLE, SELF-CONTAINED TOILET APPARATUS

[75] Inventors: Paul J. Becker, Wichita, Kans.; Bruce D. Becker, Denver, Colo.

[73] Assignee: GTS, Inc., Wichita, Kans.

[21] Appl. No.: 799,700

[22] Filed: Feb. 11, 1997

[51] Int. Cl.$^6$ .................................................. A47K 11/04
[52] U.S. Cl. ............................................. 4/483; 4/323
[58] Field of Search .............................. 4/321–323, 449, 4/476, 478, 483

[56] References Cited

U.S. PATENT DOCUMENTS

| | | | |
|---|---|---|---|
| 804,019 | 11/1905 | Lotz | 4/478 |
| 2,957,183 | 10/1960 | Nagel et al. | 4/476 X |
| 4,641,383 | 2/1987 | Sargent et al. | 4/323 |

*Primary Examiner*—Charles E. Phillips
*Attorney, Agent, or Firm*—Phillip A. Rein

[57] ABSTRACT

A portable, collapsible, self-contained toilet apparatus including a basic storage container assembly operable to receive and support a foldable seat and anchor assembly connected thereto and provided with a usage accessories assembly for conventional use including a cleansing/flushing operation. The basic storage container assembly includes a main storage body assembly having a removable seat support and flush assembly and a seat support and drain assembly. The seat support and flush assembly is removable to receive the foldable seat and anchor assembly connected thereto for use in a normal toilet function operation. In a cleansing/flushing operation, the seat support and flush assembly is connected to a garden hose assembly to provide cleansing fluid to the main storage body assembly and an enclosure support and plug member of the seat support and drain assembly is removed to receive a dumpster hose assembly connected thereto. The flushing fluid is selectively supplied through the garden hose assembly to the interior of the main storage body assembly for discharge of the cleansing fluid in combination with waste material therein through the dumpster hose assembly in the cleansing/flushing operation. The foldable seat and anchor assembly is mounted about the basic storage container assembly and held thereagainst by an anchor strap assembly in the folded, collapsed condition for ease of conveyance or storage until further use thereof.

20 Claims, 6 Drawing Sheets

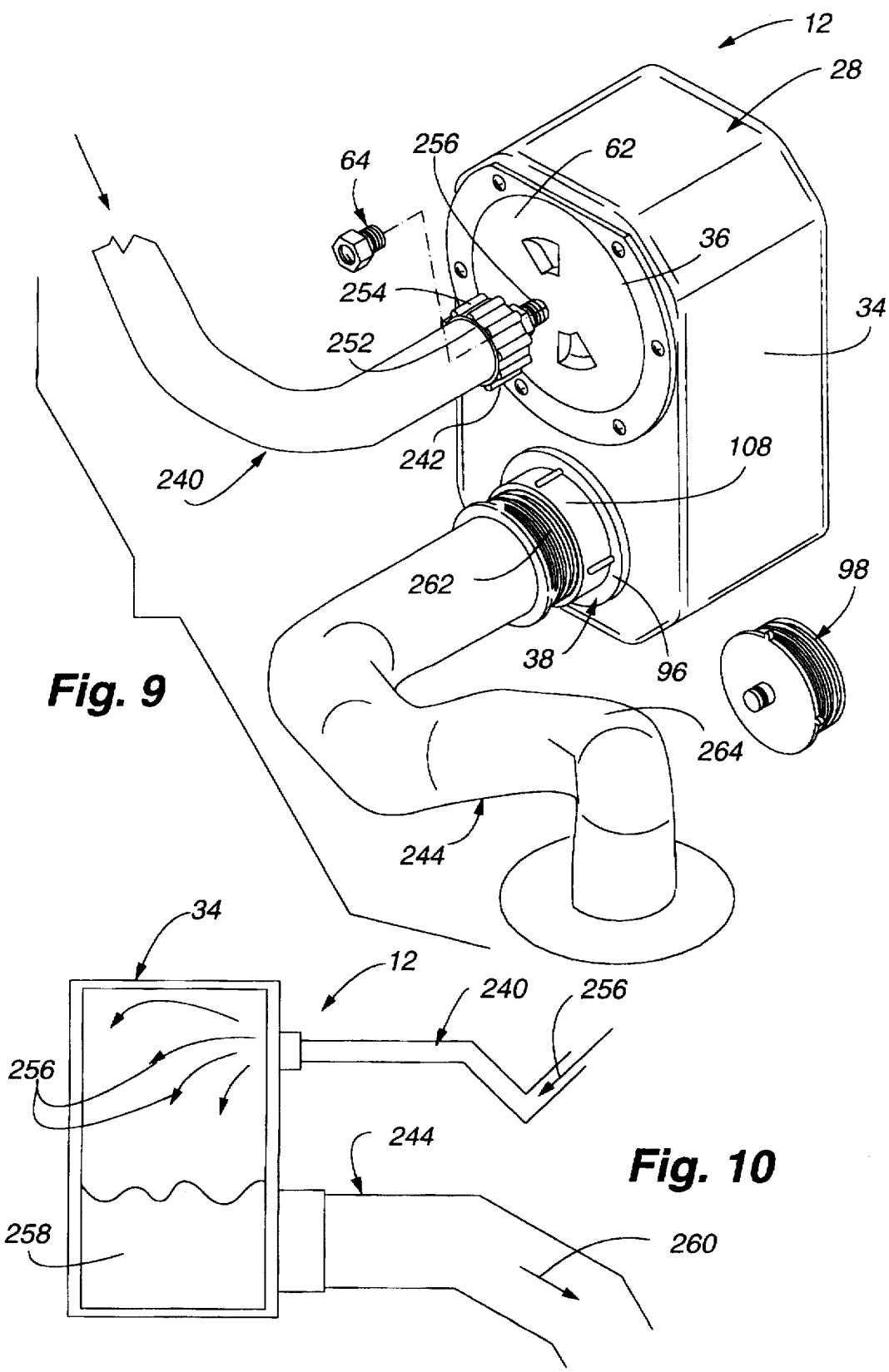

5,781,940

PORTABLE, COLLAPSIBLE, SELF-CONTAINED TOILET APPARATUS

PRIOR ART

A patent search on this invention revealed the following United States patents:

| PAT. NO. | INVENTION | INVENTOR |
|---|---|---|
| 1,764,843 | PORTABLE TOILET | Irene E. Ledger |
| 3,435,464 | PORTABLE TOILET | David B. Harding |
| 3,801,991 | PORTABLE, SELF-CONTAINED TOILET | Fulton et al |
| 3,851,339 | PORTABLE, SELF-CONTAINED TOILET | Flinner et al |
| 3,949,430 | PORTABLE TOILET | Millet et al |
| 4,228,551 | BABY TOILET | Lee Chiung-Feng |
| 4,641,383 | PORTABLE TOILET HOLDING TANK SPOUT | Sargent et al |
| 5,088,134 | PORTABLE NON-FLUSHING TOILET | Ian F. Douglas |
| 5,367,718 | CONTAINERS | William E. G. Ellis |

The Ledger patent discloses a portable toilet for use by children and to be carried in an automobile. This structure is an expandable container structure having a lid member thereon and not deemed pertinent to your invention.

The Harding patent discloses a portable toilet which is a large container member having a lid assembly thereon with a conventional toilet seat assembly connected thereto. The toilet seat assembly is depressed to open flap doors and, concurrently, dispense a toilet spray chemical therein.

The Fulton et al and Flinner et al patents (same joint inventors) are substantially identical disclosing portable, self-contained toilets. The Fulton et al patent is a conventional portable, self-contained toilet having a bottom reservoir tank to which is connected an upper combination toilet seat and reservoir assembly. The toilet seat and reservoir assembly has a lid member to enclose a seat member in a conventional manner and a flush pump operable to achieve a fluid flow flushing operation. Each reservoir member is provided with a filling port or sealing cap and having a respective handle member associated therewith for ease of carrying and portability (FIGS. 3 and 4). A slide valve assembly is operable through a handle member to open and close access between the top toilet bowl and seat assembly and the bottom reservoir assembly.

The Flinner et al patent discloses a conventional toilet bowl and seat operation having all the elements, namely, a lid member and a seat member; a toilet bowl member; a pump member for flushing the toilet bowl member; and an access opening into a lower reservoir holding tank. The only difference from a conventional toilet bowl and seat assembly is that it is not attached to a normal utility water supply nor discharged into a normal sewer system.

The Miller et al patent discloses a portable toilet which is rather large, complex, and expensive utilizing a self-contained storage unit and having a pump apparatus to achieve a flushing action therewith. This patent utilizes a bellows hand pump to achieve a flushing action and a slide valve assembly to seal off a lower container tank. This is a conventional assembly of a portable toilet and not concerned with size for use in canoes, kayaks and the like.

The Chiung-Feng patent discloses a baby toilet having a seat thereon engageable with a support base so as to dispense waste into a plastic bag member.

The Sargent et al patent discloses a portable toilet holding tank spout for dumping therefrom as noted in FIG. 9. An upper water reservoir has fresh water therein for a fluid flushing operation and the water and waste product is dispensed through a slide valve.

The Douglas patent discloses a portable non-flushing toilet having an expandable, adjustable container and seat assembly. A plastic bag is used to receive waste products therein as noted in FIGS. 1 and 2. A top portion is movable from the open to the closed conditions while concurrently rotating a portion of a plastic bag member in order to form a seal with the contents therein.

The Ellis patent discloses a container member with a removable lid member mounted thereon and is not pertinent to the applicant's invention herein.

PREFERRED EMBODIMENT OF THE INVENTION

In one preferred embodiment of this invention, a portable, collapsible, self-contained toilet apparatus is provided which can provide a complete sanitary toilet apparatus which is readily conveyable; compact; requires a minimum amount of a storage area; easy to use; and easy to cleanse after usage.

The portable, collapsible, self-contained toilet apparatus can be readily carried into a wilderness area in compact areas, such as on a kayak being placed on an interior thereof in order to achieve today's requirements during camping and the like in that everything that a person brings into the wilderness should be carried out of the wilderness so as to leave the wilderness undisturbed or unaltered in any manner whatsoever.

The portable, collapsible, self-contained toilet apparatus includes 1) a basic storage container assembly; 2) a foldable seat and anchor assembly releasably connected to the basic storage container assembly; and 3) a usage accessory assembly to be conveyed with the overall unit or as an accessory providing means for usage thereof and a flushing and cleansing operation after usage as will be noted.

The basic storage container assembly includes 1) a main storage body assembly; 2) a seat support and flush assembly connected to the main storage body assembly; and 3) a seat support and drain assembly connected to the main storage body assembly.

The main storage body assembly includes a storage body member of irregular shape and constructed of a rigid, durable plastic material and operable as a container to selectively receive body waste materials, toilet paper, and a cleansing disinfectant/deodorant liquid during usage plus clear water therein during a cleansing, flushing operation as will be explained.

The seat support and flush assembly includes 1) a main support flange member anchored to a seat support opening in the main storage body assembly; 2) a seat enclosure cap member operable to be releasably connected to the main support flange member; and 3) a plug and valve member mounted within a central plug opening in the seat enclosure cap member to be selectively removed to receive a water supply from a hose assembly during a cleansing/flushing operation as will be explained.

The main support flange member is provided with an anchor section having a central opening with threads to threadably receive and secure the seat enclosure cap member therein. The main support flange member is secured by anchor members to a top wall of the storage body member.

The seat enclosure cap member is provided with threads engageable with the threads on the main support flange member and having a central plug opening with thread members therein.

The plug and valve member is provided with a plug body member with external threads to be mounted within the central plug opening in the seat enclosure cap member.

Further, the plug and valve member includes a plug body member having a valve member mounted within a central valve opening therein. The valve member is of an automatic pressure release type to discharge excessive pressure build-up within the main storage body assembly due to gases generated from waste materials contained therein.

The seat support and drain assembly is provided with a support flange member having an enclosure support and plug member mounted therein. The support flange member is provided with a central support section with internal threads to releasably receive the enclosure support and plug member therein.

The enclosure support and plug member includes a main plug body with external anchor threads engageable with the internal threads on the support flange member and having a seat connector post centrally positioned on a top surface thereof.

The seat connector post is provided with two spaced connector grooves to selectively receive and support a portion of the foldable seat and anchor assembly connected thereto in both a usage condition and a storage condition as will be explained.

The foldable seat and anchor assembly includes 1) a foldable seat assembly; and 2) an anchor strap assembly connected to the foldable seat assembly. The anchor strap assembly is engageable with the basic storage container assembly to hold in an enclosed collapsed condition for ease of conveyance or placement in a storage condition.

The foldable seat assembly includes 1) a main toilet bowl; 2) a foldable seat wing assembly pivotally connected to the main toilet bowl; and 3) a container anchor member secured to the main toilet bowl to provide an anchor support feature when in the usage condition as will be explained.

The main toilet bowl is of a generally rectangular shape having an upper large rectangular opening surrounding side and end wall sections tapered downwardly to a bottom wall section having a discharge opening therein. The bottom wall section is provided with a connector flange releasably engageable and mounted within the main support flange member on the seat support and flush assembly of the basic storage container assembly when in usage as will be explained.

The foldable seat wing assembly is provided with two seat wing members each connected by a living hinge assembly to opposite parallel opposed edges of the side wall sections of the main toilet bowl.

Each seat wing member is pivotal with the respective living hinge assemblies so as to be movable from an inclined usage condition to a folded condition parallel and aligned with an adjacent side wall section as will be noted.

The container anchor member is provided with an anchor support section having one end pivotally connected to an adjacent end wall section and integral with a container support section. The container support section is provided with a key lock opening thereon for selective anchoring to the seat connector post on the enclosure support plug member of the seat support and drain assembly when in the usage condition as will be explained.

The anchor strap assembly includes a main enclosure strap member connected to a handle strap member which, in turn, is secured to a portion of the foldable seat assembly. The main enclosure strap member is provided with a connector section of circular shape adapted to be selectively mounted about the foldable seat assembly which, in the folded condition, encloses a portion of the basic storage container assembly. The connector section acts as an anchor about the basic storage container assembly to hold the various parts and accessories thereof in the collapsed, storage condition.

As shown in FIG. 8, a second embodiment of a basic storage container assembly is provided having 1) a main storage body assembly; 2) a seat support and flush member connected to the main storage body assembly; and 3) a seat support and drain member connected to the main storage body assembly.

As noted in FIG. 8, the main storage body assembly is substantially identical to the first embodiment except that it is constructed of a one-piece molded construction having a support flange member and a support flange section, both integrally connected and laterally extended from a top wall of a storage body member. In this case, the support flange member and the support flange section are both provided with external threads thereon to receive a respective seat enclosure cap and an enclosure support and plug member threadably mounted thereon.

Other than the change between use of a cap and a plug between the embodiments of FIG. 3 and FIG. 8, the second embodiment presents ease of construction and cost savings during manufacturing. Both of the embodiments of FIG. 3 and FIG. 8 operate in substantially the identical manner during use and operation thereof as will be explained.

The usage accessories assembly includes 1) a garden hose assembly operable to be connected to a pressure water supply for flushing/cleansing purposes; 2) a flush adapter assembly operable to be connected to the garden hose assembly and to the seat support and flush assembly and, more specifically, a central plug opening in the seat enclosure cap member to provide cleansing fluid internally thereof, 3) a dumpster hose assembly operable to be mounted within the support flange member on the seat support and drain assembly in order to receive and transfer a cleansing fluid combined with waste materials from the interior of the main storage body assembly during a cleansing operation; 4) a plug wrench member operable to be utilized in removing the plug and valve member from the seat enclosure cap member; 5) a disinfectant/deodorant bottle assembly operable to be sprayed within the interior of the main storage body assembly after use thereof to act as a deodorant and disinfectant to body waste materials that may be contained therein; and 6) a toilet paper dispenser operable to be used by an operator in a conventional bodily toilet function operation and is normally placed within the main storage body assembly after usage for subsequent discharge therefrom during a flushing/cleansing operation as will be noted.

The portable, collapsible, self-contained toilet apparatus of this invention is readily collapsed, conveyed, and stored in the condition as shown in FIG. 2 having a portion of the usage accessories assembly elements contained therein and the handle strap member is readily grasped for ease of conveyance.

OBJECTS OF THE INVENTION

One object of this invention is to provide a portable, collapsible, self-contained toilet apparatus having a maximum storage capacity in relation to an overall minimum compact size when in the folded collapsed condition ready for conveyance and storage purposes and being readily expanded to provide a normal size foldable seat and anchor assembly for use during a body waste disposal function.

Another object of this invention is to provide a portable, collapsible, self-contained toilet apparatus having a basic storage container assembly operable to receive and support a foldable seat and anchor assembly thereon in an expanded condition for use by a person on removing body waste and depositing within the basic storage container assembly and operable to support a person seated thereon in a comfortable manner as the foldable seat and anchor assembly is of a size equal to a conventional toilet seat assembly.

One other object of this invention is to provide a portable, collapsible, selfcontained toilet apparatus which 1) can be presented in a collapsed, folded condition for ease of conveyance and storage; and 2) can be readily expanded with a minimum amount of effort to a usage condition having a foldable seat assembly to receive and support a person seated thereon during usage; 3) can be readily collapsed back into the folded storage condition for ease of conveyance from one site to another during a camping operation as encountered on a canoe or kayak trip on a river which may last numerous days; and 4) provides means for compliance with some rules, laws, and regulations requiring that no human waste products, including toilet paper, shall be deposited or remain in a wilderness area.

A further object of this invention is to provide a portable, collapsible, selfcontained toilet apparatus constructed of lightweight plastic material being easy to clean to maintain sterile and having a substantial carrying capacity within a main storage body assembly of minimum size.

One further object of this invention is to provide a portable, collapsible, selfcontained toilet apparatus which is foldable into a collapsed condition for ease of storage and conveyance; readily expanded to a rigid assembled condition for receiving and supporting a person seated thereon; and having means therein for ease of connection to a garden hose assembly and a dumpster hose assembly to receive fresh water therein to achieve an efficient cleansing and flushing with the flushing fluid and waste material discharged through the dumpster hose assembly into a ground storage tank as found in a legal recreational vehicle dump, sanitary waste disposal site, or similar locations.

Still, one other object of this invention is to provide a portable, collapsible, selfcontained toilet apparatus being of a minimum size but maximum carrying capacity acting as a body waste toilet assembly; economical to manufacture; easy to assemble and disassemble for usage and storage purposes; easy to attach to a garden hose to use water for flushing cleansing purposes; and substantially maintenance free.

Various other objects, advantages, and features of the invention will become apparent to those skilled in the art from the following discussion, taken in conjunction with the accompanying drawings, in which:

FIGURES OF THE INVENTION

Figure 5:
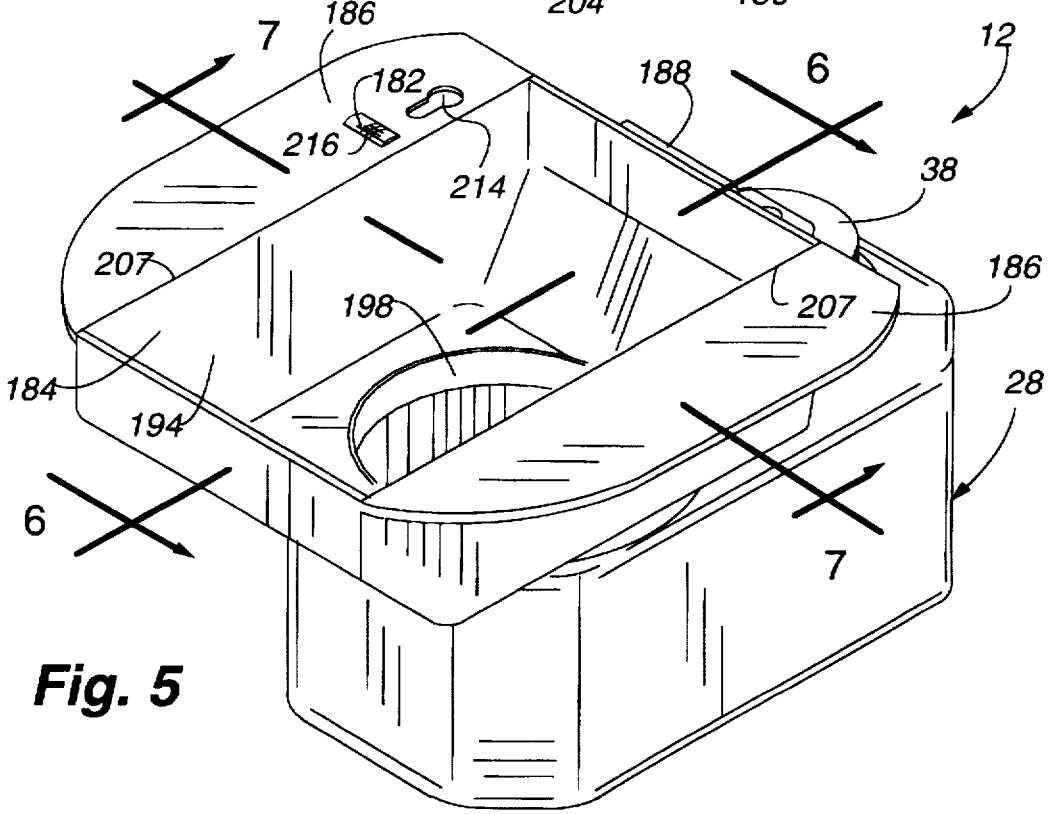
FIG. 5 is a perspective view illustrating the portable, collapsed, self-contained toilet apparatus in an assembled usage condition.
Figure 7A:
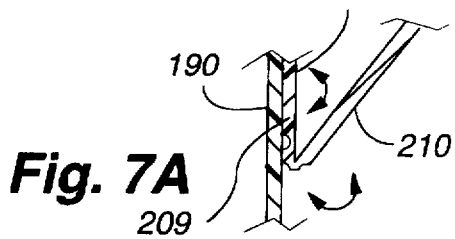
Figure 7:
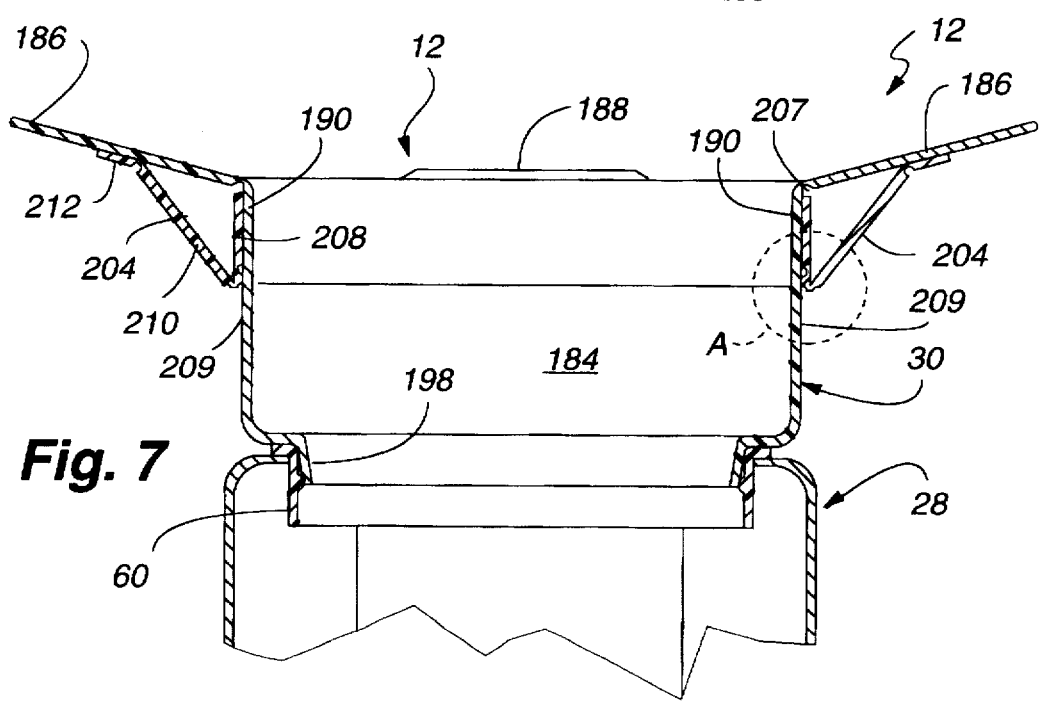
Figure 8:
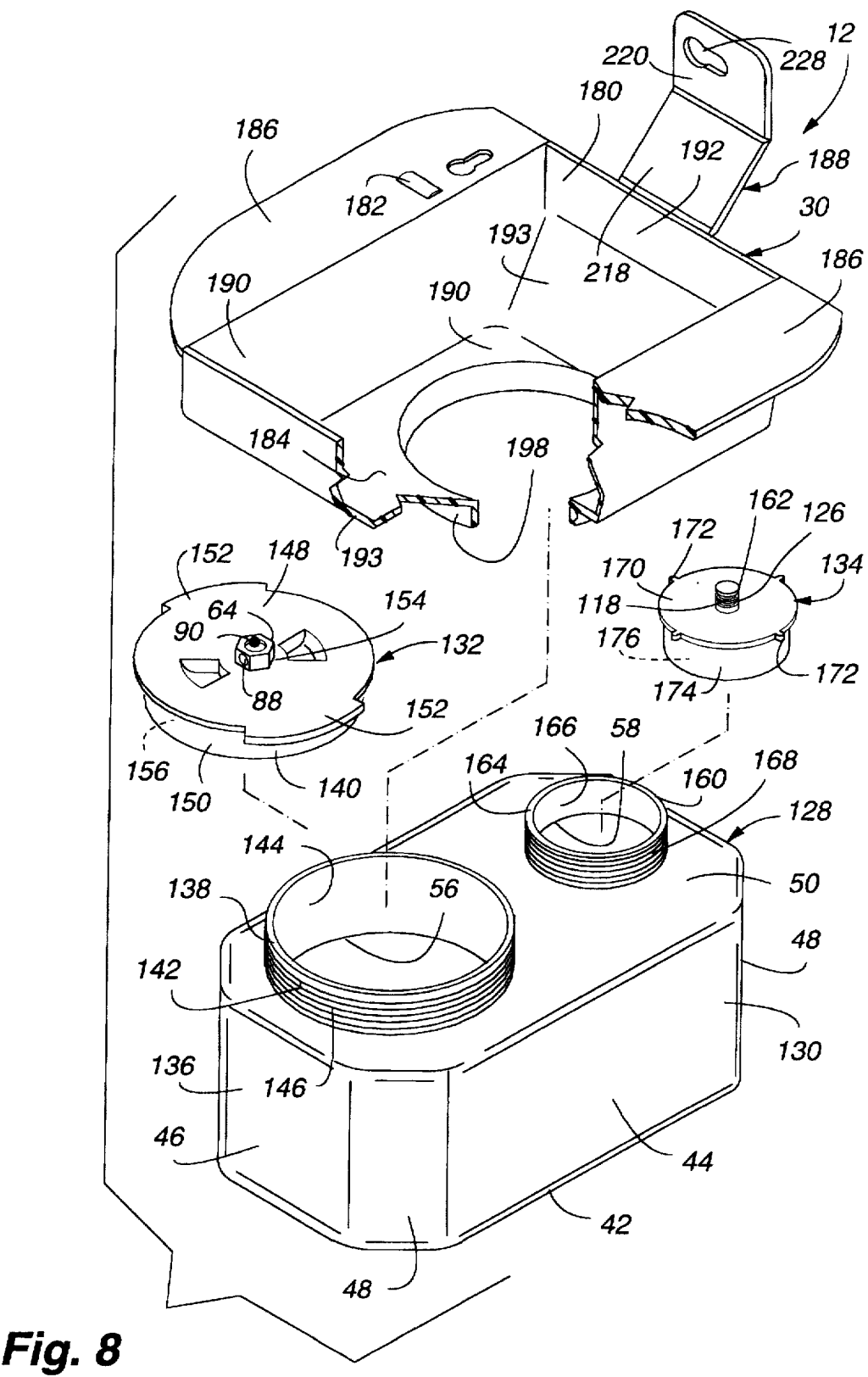

FIG. 7 it is an enlarged fragmentary sectional view taken along line 7—7 in FIG. 5;

FIG. 7A is an enlarged view of circle A taken from FIG. 7;

FIG. 8 is an exploded perspective view of a second embodiment of the portable, collapsible, self-contained toilet apparatus of this invention having a portion thereof broken away for clarity;

FIG. 9 is a perspective view illustrating interconnection of a garden hose assembly and a dumpster hose assembly in a cleansing/flushing operation; and FIG. 10 is a schematic diagram illustrating the cleansing/flushing action of the portable, collapsible, self-contained toilet apparatus of this invention.

The following is a discussion and description of preferred specific embodiments of the portable, collapsible, self-contained toilet apparatus of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Figure 1:
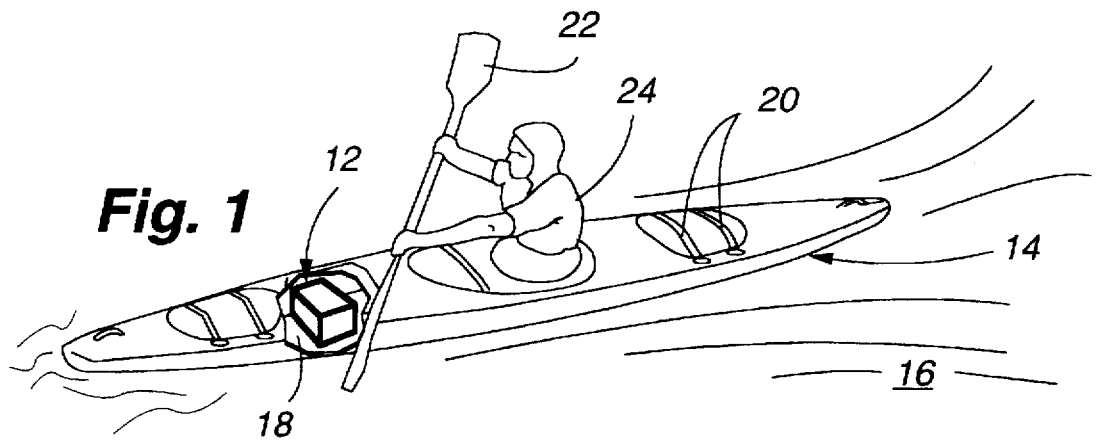
FIG. 1 is a perspective view of a kayak on a river with a kayak operator holding a paddle member and a portion of the kayak is broken away to show a portable, collapsible, self-contained toilet apparatus of this invention conveyed therein.

On referring to the drawings in detail, and in particular to FIG. 1, a portable, collapsible, self-contained toilet apparatus of this invention, indicated generally at 12, is shown as being conveyed within a kayak 14 on a lake or river 16 and having a kayak operator 24 utilizing a paddle member 22 to navigate the kayak 14 on the river 16.

The kayak 14 is provided with an internal storage area 18 having the portable, collapsible, self-contained toilet apparatus 12 mounted therein and can utilize an anchor strap 20 for securing in a given storage position within the internal storage area 18.

Figure 2:
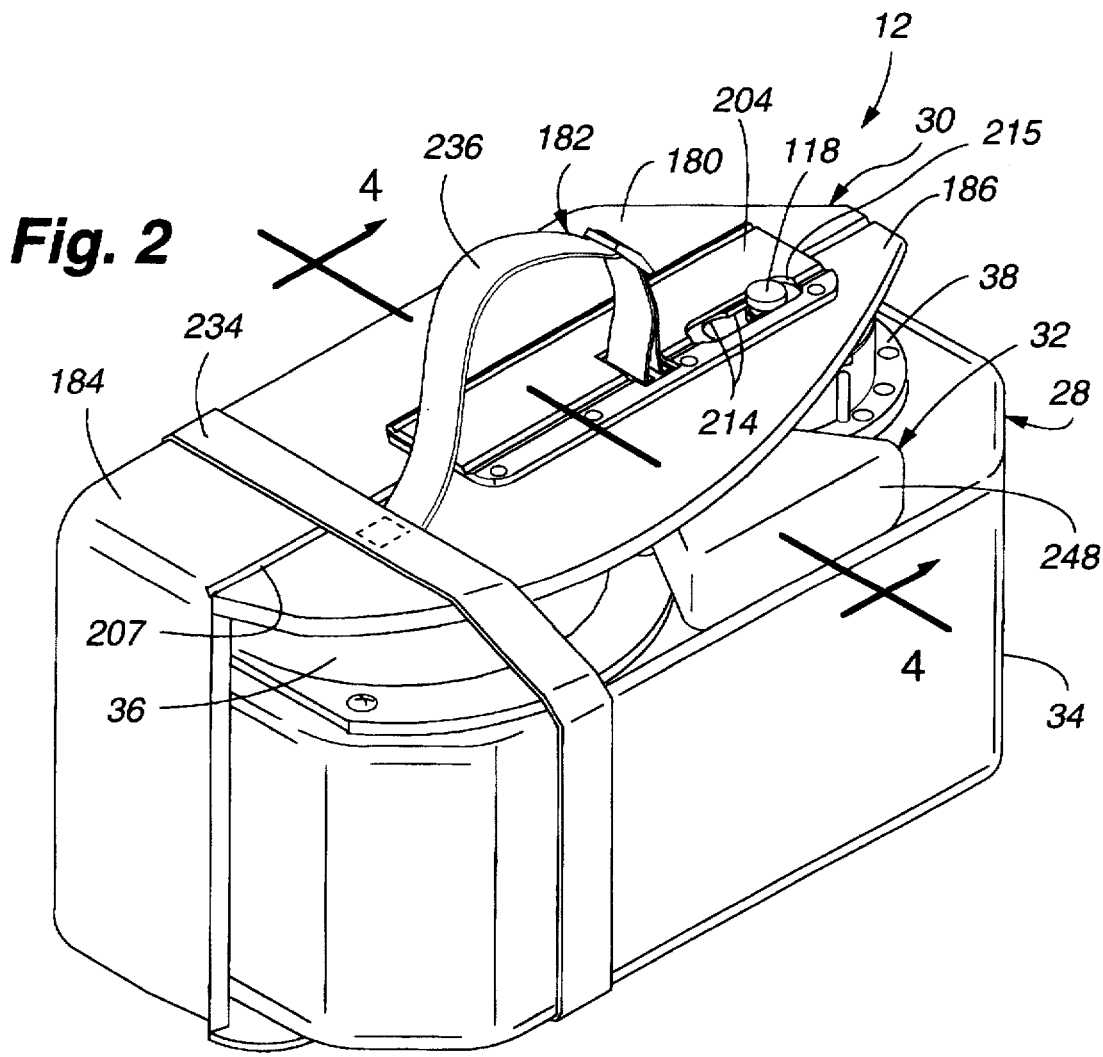
FIG. 2 is a perspective view of the portable, collapsible, self-contained toilet apparatus of this invention in a collapsed storage or conveyance condition.

As shown in FIG. 2, the portable, collapsible, self-contained toilet apparatus 12 is illustrated in a compact assembled condition for ease of storage and conveyance and having 1) a basic storage container assembly 28; 2) a foldable seat and anchor assembly 30 mounted about the basic storage container assembly 28; and 3) elements of a usage accessory assembly 32 mounted within or between the foldable seat and anchor assembly 30 and the basic storage container assembly 28.

Figure 3:
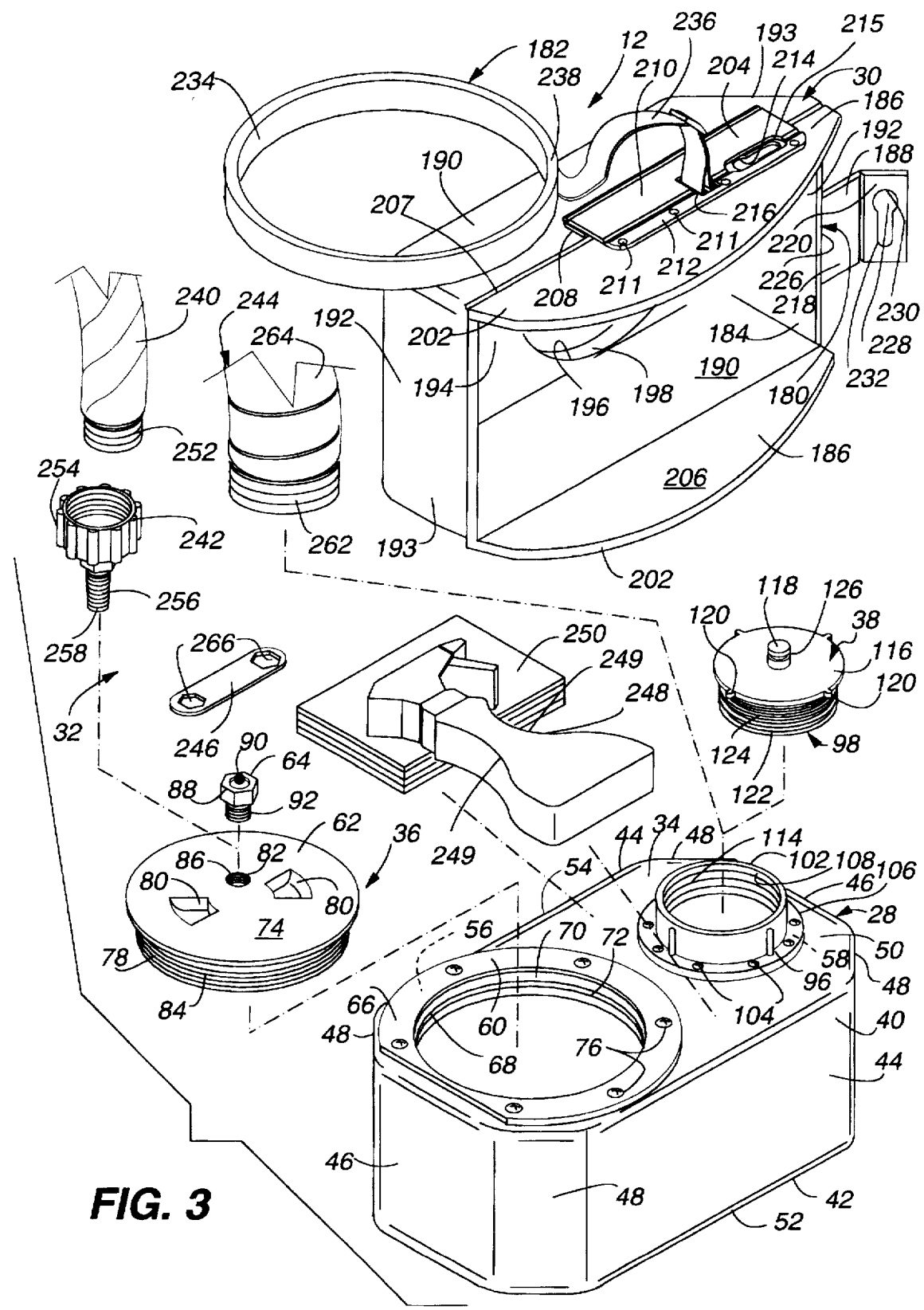
FIG. 3 is an exploded perspective view thereof illustrated with a elements of a usage accessories assembly.
Figure 4:
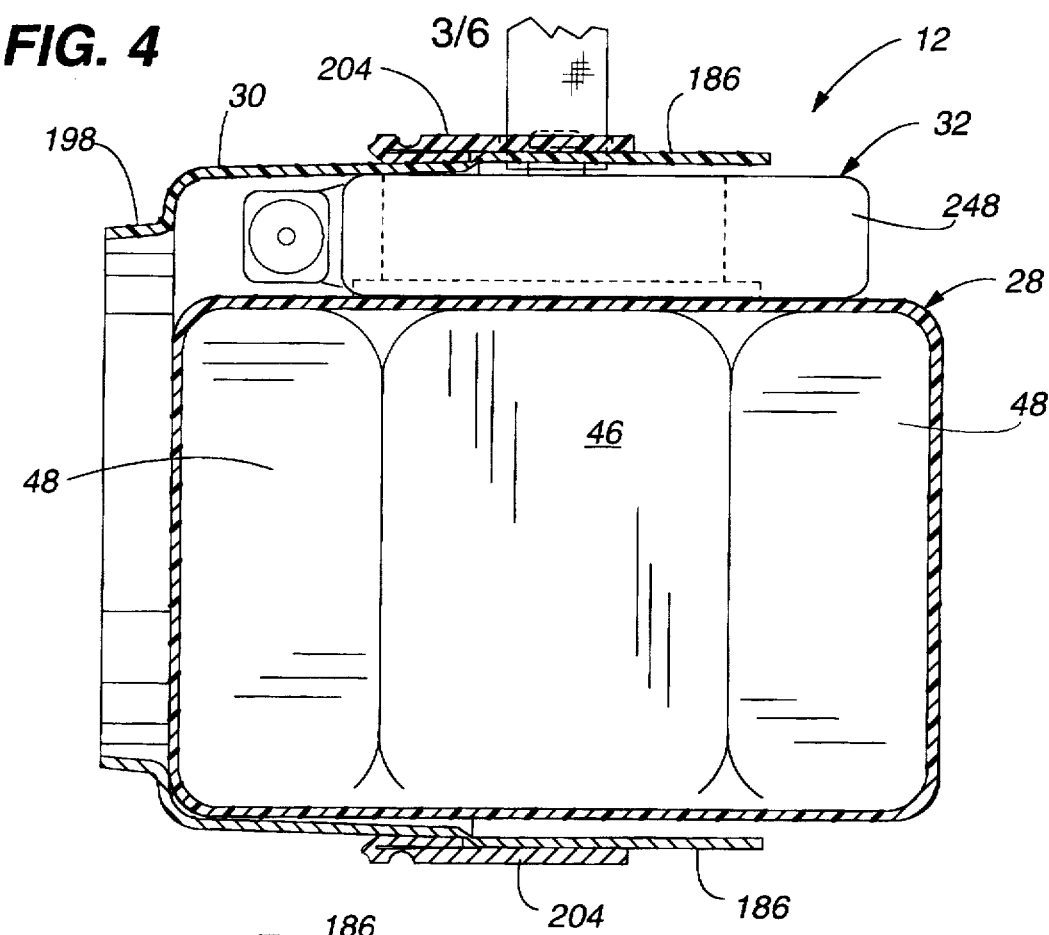
FIG. 4 is an enlarged sectional view taken along line 4—4 in FIG. 2.

As best shown in FIG. 3, the basic storage container assembly 28 includes 1) a main storage body assembly 34; 2) a seat support and flush assembly 36 adapted to be operably connected to the main storage body assembly 34; and 3) a seat support and drain assembly 38 which is also adapted to be operably connected to the main storage body assembly 34.

The main storage body assembly 34 is basically a receptacle or container having a storage body member 40 provided with 1) a bottom wall 42; 2) spaced parallel side walls 44; 3) spaced parallel end walls 46; 4) inclined walls 48 interconnecting the side walls 44 and the end walls 46; and 5) a top wall 50. The bottom wall 42 is provided with outer arcuate portions 52 to provide gradual curved surfaces to aid in flushing thereof in a manner to be explained.

The top wall 50 is provided with 1) outer arcuate portions 54 for ease of cleansing and flushing; 2) a seat support opening 56; and 3) a flush clean-out opening 58 to be used in a manner to be described.

Also, as shown in FIG. 3, the seat support and flush assembly 36 includes 1) a main support flange member 60 mounted within the seat support opening 56 in the top wall 50; 2) a seat enclosure cap member 62 releasably connectable to the main support flange member 60; and 3) a plug and valve member 64 removably mounted within a central opening in the seat enclosure cap member 62.

The main support flange member 60 includes a support rim member 66 connected to an anchor thread section 68. The support rim member 66 is secured by a plurality of anchor members or screws 76 to the top wall 50 of the main storage body assembly 34.

The anchor thread section 68 includes a central opening 70 having internal threads 72 to receive the seat enclosure cap member 62 therein as will be explained.

The seat enclosure cap member 62 includes a cap body member 74 having 1) a flange section 78; 2) spaced indentations 80; and 3) a central plug opening 82. The flange section 78 is provided with external threads 84 engageable with the internal threads 72 of the main support flange member 60 when in the assembled condition.

The central plug opening 82 is provided with internal thread portions 86 to releasably receive the plug and valve member 64 therein. The plug and valve member 64 is provided with a plug body member 88 having a valve member 90 mounted therein.

The plug body member 88 is provided with external threads 92 engageable with the internal thread portions 86 of the central plug opening 82 and having a central valve opening therein.

The valve member 90 is mounted within the central valve opening and being of a pressure release type which will automatically open on a predetermined and preset pressure obtained within the main storage body assembly 34 for reasons to be explained. The valve member 90 can be separate and mounted within its' own plug opening in the cap body member 74.

The seat support and drain assembly 38 includes 1) a support flange member 96; and 2) an enclosure support and plug member 98 which is releasably connectable to the support flange member 96.

As best shown in FIG. 3, the support flange member 96 includes 1) a main flange body 102; and 2) a plurality of anchor screw members 104 to secure the main flange body 102 to an adjacent portion of the top wall 50 of the main storage body assembly 34.

The main flange body 102 includes an anchor rim section 106 which is integral with a central support section 108. The anchor rim section 106 is provided with a plurality of anchor holes operable to receive the respective anchor screw members 104 therethrough.

The central support section 108 is provided with a central opening having internal threads 114 therein operable to receive and anchor the enclosure support and plug member 98 therein.

The enclosure support and plug member 98 includes 1) a main plug body 116; 2) a seat connector post 118 connected to and extended laterally from a central portion of the main plug body 116; and 3) a pair of lugs 120 to assist in rotation in a conventional manner.

The main plug body 116 includes an outer support section 122 having external anchor threads 124 thereon for selective engagement with the internal threads 114 on the support flange member 96.

Figure 6:
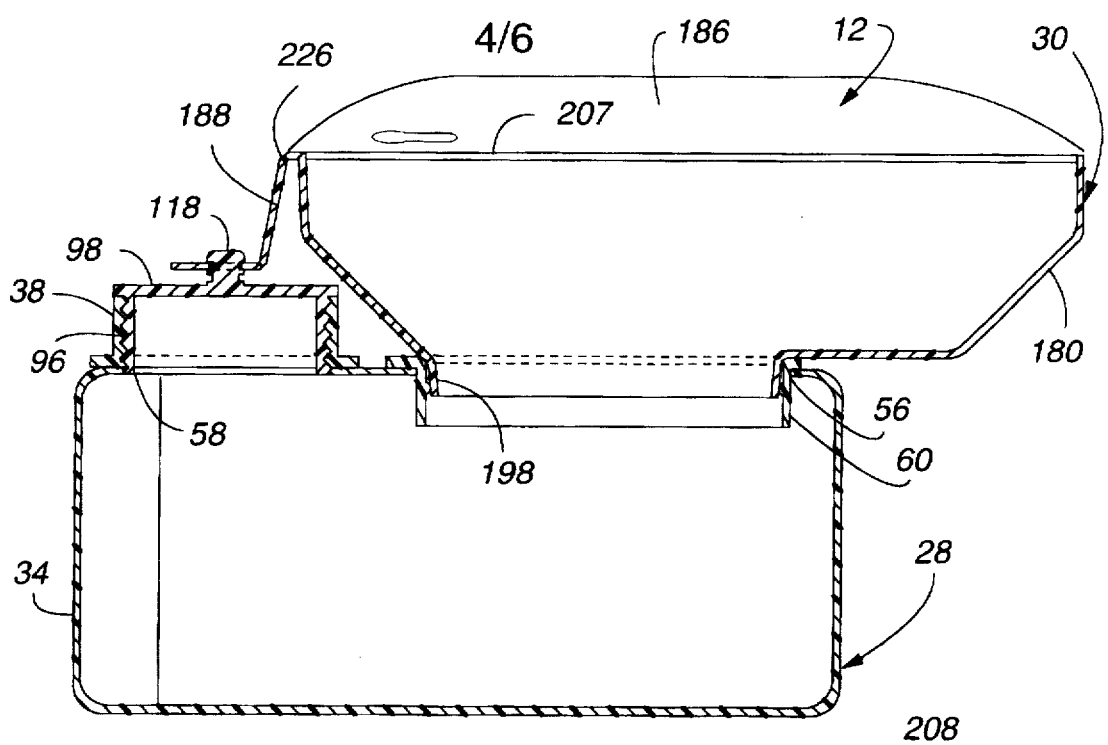
FIG. 6 is an enlarged sectional view taken along line 6—6 in FIG. 5.

The seat connector post 118 is provided with a pair of spaced parallel connector grooves 126 thereon operable to engage a portion of the foldable seat and anchor assembly 30 when in the storage condition as noted in FIG. 2 or the usage condition as set forth in FIG. 6. The connector grooves 126 are operable to receive a portion of key lock type openings in the anchor connecting condition as will be explained.

A second embodiment, as shown in FIG. 8, is provided whereupon the basic storage container assembly 28 has been re-designed into use of cap members instead of plug members and having the main storage body assembly 34 formed into a one-piece molded construction.

More particularly, as noted in FIG. 8, a basic storage container assembly 128 is provided having 1) a main storage body assembly 130; 2) a seat support and flush member 132 connected to the main storage body assembly 130; and 3) a seat support and drain member 134 connected to the main storage body assembly 130.

The main storage body assembly 130 includes a storage body member 136 having the previously described bottom wall 42, side walls 44, end walls 46, inclined walls 48, and a top wall 50. The top wall 50 is provided with the seat support opening 56 and flush clean-out opening 58.

The seat support and flush member 132 is provided with a support flange member 138 and a seat enclosure cap 140. The support flange member 138 is integral with and extends upwardly from the top wall 50 and having an anchor thread section 142 with a central opening 144 and external threads 146 to receive the seat enclosure cap 140 thereon.

The seat enclosure cap 140 is provided with 1) a cap body section 148 having a flange portion 150; 2) laterally extended actuator ears 152; and 3) a central plug opening 154. The flange portion 150 is provided with internal threads 156 to receive the external threads 146 of the support flange member 138 therein in a connected condition.

The central plug opening 154 is provided with internal threads therein to receive the previously described plug and valve member 64 therein.

The plug and valve member 64 includes the plug body member 88 operable to threadably receive the valve member 90 therein. The valve member 90 acts as a pressure release valve to relieve any pressure build-up within the storage body member 136.

As shown in FIG. 8, the seat support and drain member 134 includes 1) a support flange section 160 formed integrally with the top wall 50 of the storage body member 136; and 2) an enclosure support and plug 162 releasably engageable and mountable on the support flange section 160. The support flange section 160 includes a main flange section 164 having a central opening 166 provided on the outer portion with external threads 168.

The enclosure support and plug 162 includes 1) a main plug body 170; and 2) a seat connector post 118 secured to an upper central portion of the main plug body 170.

The main plug body 170 is provided with laterally extended actuator lugs 172 and a connector flange 174. The connector flange 174 is provided with internal threads 176 to be selectively and releasably mounted on the external threads 168 of the support flange section 160.

The seat connector post 118 is as previously described having a pair of spaced parallel connector grooves 126 for anchoring the foldable seat and anchor assembly 30 therein when in the compact condition of FIG. 2 or the usage condition of FIGS. 5 and 6 as will be explained.

As shown in FIG. 3, the foldable seat and anchor assembly 30 includes 1) a foldable seat assembly 180; and 2) an anchor strap assembly 182 connected to the foldable seat assembly 180 and operable for a) ease of conveyance; and b) clamping and holding in the folded collapsed condition as shown in FIG. 2.

The foldable seat assembly 180 includes 1) a main toilet bowl 184; 2) a foldable seat wing assembly 186 being pivotally connected to the main toilet bowl 184; and 3) a container anchor member 188 secured to the main toilet bowl 184. The main toilet bowl 184 is provided with side wall sections 190 integral with end wall sections 192, all of which are integral with a bottom wall section 194.

The end wall sections 192 are integral with inclined portions 193 for ease of cleansing and removal of waste material therefrom as will be explained.

The bottom wall section 194 is provided with a main discharge opening 196 positioned centrally of a connector flange 198. The connector flange 198 is mountable within the seat support opening 56 (FIG. 6) in the assembled usage condition.

The foldable seat wing assembly 186 is provided with two seat wing members 202, each interconnected by a living hinge assembly 204 to upper, outer edges of the spaced side wall sections 190 of the main toilet bowl 184.

Each seat wing member 202 is provided with an arcuate support body 206 secured by a living hinge member 207 and the living hinge assembly 204 to the respective side wall sections 190.

As noted in FIG. 5, one of the seat wing members 206 is provided with a key lock cut-out 214 and a pair of adjacent, parallel strap support slots 216 to receive and secure the anchor strap assembly 182 thereto.

As best shown in FIG. 7, the living hinge assembly 204 includes a first anchor section 208 pivotally connected to a lateral support hinge section 209 to an intermediate hinge section 210 which, in turn, is connected to a seat anchor section 212. The seat anchor section 212 is provided with an adhesive or anchor members 211 for securing to the respective seat wing members 202.

The first anchor section 208 is secured to the adjacent, respective, side wall sections 190 by an adhesive or anchor members 211, such as rivets.

More particularly, as noted in FIG. 7A, the lateral support hinge section 209 is pivotally connected along opposed parallel side walls to respective ones of the first anchor section 208 and the intermediate hinge section 210. An inner portion of the support hinge section 209 rests against an outer respective surface of the side wall sections 190 to provide solid vertical support to the seat wing members 202 when in the usage position as shown in FIG. 7.

As shown in FIG. 3, the intermediate hinge section 210 is provided with a cut-out 215 to allow the seat connector post 118 to extend therethrough when in the folded, collapsed condition of FIG. 2.

As shown in FIG. 3, the container anchor member 188 is provided with 1) an anchor support section 218 connected to an upper edge of the adjacent end wall 46 of the storage body member 40; and 2) a container support section 220 pivotally connected to the anchor support section 218. The anchor support section 218 is provided with a flange portion having a connector portion 226 pivotally connected to the storage body member 40.

The container support section 220 is provided with a key lock opening 228 having an entrance portion 230 integral with a narrower lock portion 232 being engageable with the seat connector post 118 on the enclosure support and plug member 98 on the enclosure support and plug 162 when in the assembled storage or expanded usage conditions as will be explained.

As shown in FIG. 3, the anchor strap assembly 182 includes a main enclosure strap member 234 integral with a handle strap member 236. A portion of the handle strap member 236 is mounted and anchored within the strap support slots 216 in the living hinge assembly 204.

The main enclosure strap member 234 is provided with a connector section 238 which is adapted to be mounted about and enclose the foldable seat and anchor assembly 30 about the main storage body assembly 34 in the compact storage condition as noted in FIG. 2.

As shown in FIG. 3, the usage accessories assembly 32 includes 1) a garden hose assembly 240 to be connected to an input water supply for a cleansing/flushing action as will be explained; 2) a flush adapter assembly 242 connected to the garden hose assembly 240 and the seat and support flush assembly 36 during the cleansing/ flushing operation; 3) a dumpster hose assembly 244 selectively connected to the internal threads 114 on the support flange member 96 during a cleansing/flushing operation; 4) a plug wrench member 246 operable to engage and remove the plug and valve member 64 during the cleansing/flushing operation; 5) a disinfectant/ deodorant bottle assembly 248, being a spray bottle, to be used in a manner to be explained; and 6) a toilet paper dispenser 250 for obvious needs.

The garden hose assembly 240 is provided with a male connector end 252 engageable with similar female threads on the flush adapter assembly 242. The flush adapter assembly 242 includes a connector nut member 254 connected to a cap plug member 256.

The cap plug member 256 is provided with a central opening and external threads 258 which are selectively mountable within the internal thread portion 86 of the central plug opening 82 of the seat enclosure cap member 62.

As shown in FIG. 9, the dumpster hose assembly 244 is of a conventional nature having a threaded connector member 262 connected to a conveyance hose member 264. The threaded connector member 262 is operable to be mounted within the central support section 108 of the support flange member 96.

The plug wrench member 246 is of a conventional nature having a pair of spaced hex connector openings 266 operable to be mounted about a similarly shaped portion of the valve member 90 for removing same during a cleansing/ flushing operation.

The disinfectant/deodorant bottle assembly 248 is a conventional spray bottle having a liquid contained therein to act both as a disinfectant and as a deodorant to be sprayed within the storage body member 40 after usage by a person in a toilet function.

The disinfectant/deodorant bottle assembly 248 is formed with adjacent opposed arcuate sections 249 which, when in an assembled storage condition of FIG. 2, are clamped between adjacent portions of the support rim member 66 and the flange section 78.

In the embodiment of FIG. 8, the disinfectant/deodorant bottle assembly 248 in the assembled storage condition is clamped by the arcuate sections 249 (FIG. 3) between outer adjacent surfaces of the seat support and flush member 132 and the seat support and drain member 134.

The toilet paper dispenser 250 contains tissue paper therein which can be utilized in a conventional manner during use by a person in the toilet function.

USE AND OPERATION OF THE INVENTION

In the use and operation of the portable, collapsible, self-contained toilet apparatus 12 of this invention, we will assume the folded, collapsed, portable condition as shown in FIG. 2. In this condition, it is to be noted that the garden hose assembly 240 with the flush adapter assembly 242 connected thereto, the plug wrench member 246, and the dumpster hose assembly 244 can remain in a separate bag container in the trunk of a transporting vehicle or the like as would not be needed until a cleansing/flushing operation is to be utilized after usage on a camping trip, boating experience, or the like.

As shown in FIG. 1, the kayak 14 is being moved by the kayak operator 24 traveling on the lake or river 16. The portable, collapsible, self-contained toilet apparatus 12 can be placed within the internal storage area 18 of the kayak 14 and held therein by an anchor strap 20 or the like as so required.

It is obvious that the portable, collapsible, self-contained toilet apparatus 12 can be readily carried in a backpack during a hiking operation; stored on a motor boat or sailboat; placed on a pack on a donkey or horse trekking operation; and numerous other uses where a portable, collapsible, self-contained toilet apparatus is needed.

The portable, collapsible, self-contained toilet apparatus 12 operates to provide a compact portable means of providing a toilet function operation with the usage accessories assembly 32 in order to fulfill the requirements of a United States Park and Forest Division wherein all that is packed in on a camping or similar operation must be packed out. This is important in kayaking, canoeing, and white water rafting operations as the white dumped areas along a beach are quite unattractive plus presents unsanitary conditions which is solved by the invention herein.

On having a need to utilize the portable, collapsible, self-contained toilet apparatus 12 by the kayak operator 24, hiker, or others, the first step is to remove the connector section 238 of the main enclosure strap member 234 from about the main storage body assembly 34 as noted in FIG. 2 to a released condition as shown in FIG. 3.

The next step would be to remove the disinfectant/deodorant bottle assembly 248 and the toilet paper dispenser 250 from these storage conditions on the top wall 50 of the storage body member 40.

The kayak operator 24 would thereupon proceed to remove the seat support and flush assembly 36 from its interconnection with the main support flange member 60. This is accomplished by placing one's thumb and forefinger within the indentations 80 to cause a counterclockwise rotation thereof so as to be completely removed from the internal threads 72 on the main support flange member 60 as noted in FIG. 3.

At a desired location, the main storage body assembly 34 would be placed in an upright condition to rest the bottom wall 42 in a support ground surface in contemplation of attaching the foldable seat and anchor assembly 30 thereto to achieve the condition of FIG. 5.

The next step is to move the foldable seat assembly 180 to a generally inverted condition having the foldable seat wing members 202 in an upper, inclined position. The connector flange 198 on the bottom wall section 194 of the main toilet bowl 184 is thereupon placed within the seat support opening 56 in the top wall 50 of the storage body member 40 as noted in FIG. 6.

Next, the container anchor member 188 is moved to have its outer container support section 220 and, more specifically, the key lock opening 228 engaged with a connector groove 126 on the seat connector post 118 on the enclosure support and plug member 98 to provide support and prevent tipping and movement after a person is seated upon the foldable seat wing assembly 186.

As noted in FIG. 7, the living hinge assembly 204 with the first anchor section 208, lateral support hinge section 209, intermediate hinge section 210, and seat anchor section 212 are operable to permit the respective seat wing members 202 to be folded downwardly and extended upwardly at a generally 15±5 degree angle relative to a horizontal plane. The intermediate hinge section 210 achieves rigid support and prevents the seat wing membes 202 from pivoting any further downwardly.

An important feature of this invention is that the seat wing members 202 in conjunction with the main toilet bowl 184 presents a support area of a size equal to a conventional toilet seat member for use by the kayak operator 24 in a normal bodily waste transfer and depository action.

During use thereof, the toilet paper dispenser 250 can be utilized in a conventional manner and the waste paper deposited downwardly into the main storage body assembly 34 similar to a conventional toilet usage operation. The operator 24 may elect to use the disinfectant/deodorant bottle assembly 248 to spray a disinfectant/deodorant fluid into the main storage body assembly 34 for obvious reasons.

After usage, the foldable seat and anchor assembly 30 can be removed from the main storage body assembly 34 and, if necessary, the main toilet bowl 184 can be cleaned using the disinfectant/deodorant bottle assembly 248 and paper tissue from the toilet paper dispenser 250 before proceeding to reassemble into the condition of FIG. 2.

In proceeding with the reassembling operation, the seat support and flush assembly 36 is secured through the internal threads 72 into the main support flange member 60 to seal the contents within the main storage body assembly 34 and prevent leakage therefrom.

Next, the disinfectant/deodorant bottle assembly 248 and the toilet paper dispenser 250 are placed against an upper surface of the top wall 50 of the main storage body assembly 34.

Further, the foldable seat and anchor assembly 30 is placed about and encloses the basic storage container assembly 28 with the disinfectant/deodorant bottle assembly 248 and the toilet paper dispenser 250 mounted thereon. The seat wing members 202 are then folded downwardly so as to be in line with the side wall sections 190 as shown in FIGS. 2 and 3.

Then, the main connector section 238 of the anchor strap assembly 182 is slipped over one end of the abutting portions of the foldable seat assembly 180 and the main storage body assembly 34 and slid thereon to be positioned as noted in FIG. 2.

In this assembled condition, the handle strap member 236 can be grasped for ease of conveyance of the portable, collapsible, self-contained toilet apparatus 12 and placed into the internal storage area 18 on the kayak 14 or other conveyance locations such as in a backpack or the like.

The aforementioned usage operation of the portable, collapsible, self-contained toilet apparatus 12 can then be repeated as necessary during a hiking, boating, or other outdoor experience.

The use of the second embodiment of FIG. 8 is substantially identical as described for the first embodiment as mainly using the seat support and flush member 132 and the seat support and drain member 134 which are in the form of cap members with internal threads instead of plug members with external threads as noted in FIG. 3.

Now, after final usage of the portable, collapsible, self-contained toilet apparatus 12, it becomes necessary to cleanse the main storage body assembly 34 in a cleansing/flushing operation at a recreational vehicle dumping station or other proper means of disposing of the body waste material contained therein such as into a legal sanitary waste disposal site.

In the cleansing/flushing operation, it is obvious that the anchor strap member 182 is first moved to present the condition of FIG. 3 and is the foldable seat and anchor assembly 30 is removed as noted in FIG. 9. The disinfectant/deodorant bottle assembly 248 and the toilet paper dispenser 250 are set to one side.

The next step is to remove the valve member 90 with use of the plug wrench member 246 from the central plug opening 82 in the seat enclosure cap member 62.

Once this is accomplished, the flush adapter assembly 242 with the garden hose assembly 240 connected thereto is mounted through the cap plug member 256 threaded within the central plug opening 82 to achieve the interconnected condition as noted in FIG. 9.

Next, as noted in FIG. 9, the seat support and drain assembly 38 has the enclosure support and plug member 98 removed from the support flange member 96. The dumpster hose assembly 244 with the threaded connector member 262 is mounted within the internal threads 114 on the support flange member 96.

Next, an outer end of the conveyance hose member 264 of the dumpster hose assembly 244 is placed within a dumpster drain opening such as found in a legal sanitary waste disposal site.

Next, a fluid supply valve member is opened to supply pressure fluid, such as water, through the garden hose assembly 240 and the flush adapter assembly 242 to spray cleansing fluid about an interior of the main storage body member 34 as shown in FIG. 10.

Due to the arcuate curved portions, inclined walls 48, and design of the side walls 44 of the storage body member 40, the fluid being sprayed therein along with an agitating movement of the storage body member 40 operates to remove all traces of any body waste material contained therein which is movable downwardly when held in the vertical position of FIG. 9 for discharge through the dumpster hose assembly 244.

On referring to the schematic diagram of FIG. 10, it is noted that the incoming fresh water or cleansing fluid is moved as shown by an arrow 256 being the inlet water sprayed within the interior area of the main storage body assembly 34 which is mixed with waste material indicated at 258 therein.

This combination of the inlet cleansing fluid 256 and the waste material 258 is movable as shown by arrow 260 through the dumpster hose assembly 244 for discharge therefrom.

After the cleansing/flushing operation, it is obvious that the respective cap or plug members can be mounted and secured to the main storage body assembly 34 as shown in FIGS. 3 and 8 by following the dotted lines.

The disinfectant/deodorant bottle assembly 248 and the toilet paper dispenser 250 are mounted on the top wall 50 of the main storage body assembly 34.

At this time, the foldable seat and anchor assembly 30 in conjunction with the anchor strap assembly 182 can reassemble the portable, collapsible, self-contained toilet apparatus 12 of this invention to the condition of FIG. 2 to be conveyed through the handle strap member 236 for additional usage purposes or ease of storage in a vehicle, garage, or the like.

The portable, collapsible, self-contained toilet apparatus of this invention provides a new and novel compact easily portable means for providing for a toilet apparatus to be readily conveyed and having a maximum storage capacity with a minimum amount of size. The portable, collapsible, self-contained toilet apparatus is provided with a unique configuration and design for ease of achieving a thorough cleansing thereof after usage.

The portable, collapsible, self-contained toilet apparatus is economical to manufacture; readily movable from a storage to an assembled usage condition; presenting a foldable seat assembly equal in size to a standard toilet seat assembly for ease of usage; provided with inclined wall portions of the foldable seat assembly for ease of usage; provided with novel anchor means for securing the foldable seat and anchor assembly to the basic storage container assembly during usage operation; and sturdy in construction; and substantially maintenance free.

While the invention has been described in conjunction with preferred specific embodiments thereof, it will be understood that this description is intended to illustrate and not to limit the scope of the invention, which is defined by the following claims:

We claim:

1. A portable, collapsible, self-contained toilet apparatus, comprising:

a) a basic storage container assembly and a foldable seat assembly connectable to said basic storage container assembly;

b) said basic storage container assembly includes a main storage body assembly having a seat support opening;

c) said foldable seat assembly includes a main toilet bowl having opposed seat wing members connected thereto adapted to resemble a conventional toilet seat in an expanded usage condition; and d) said main toilet bowl mounted in said seat support opening to transfer waste products from said main toilet bowl to said main storage body assembly.

2. A portable, collapsible, self-contained toilet apparatus as described in claim 1, wherein:

a) said seat wing members connected by a respective living hinge assembly to said main toilet bowl to allow pivoted movable upper movement thereof in one direction and limited movement in the other direction to an inclined position to resemble a conventional toilet seat member.

3. A portable, collapsible, self-contained toilet apparatus as described in claim 1, wherein:

a) said main toilet bowl having a connector flange mounted within said seat support opening to assure movement of waste product therethrough from said foldable seat assembly into said main storage body assembly during usage thereof.

4. A portable, collapsible, self-contained toilet apparatus as described in claim 1, wherein:

a) said basic storage container assembly includes a seat support and flush assembly releasably mounted in said seat support opening and selectively removable to receive said foldable seat assembly in said seat support opening; and b) said basic storage container assembly includes a seat support and drain assembly mounted within a flush clean-out opening in said main storage body assembly and operable to be selectively connectable to said foldable seat assembly to hold in 1) an expanded usage condition; and 2) a collapsed, foldable condition for ease of storage and conveyance.

5. A portable, collapsible, self-contained toilet apparatus as described in claim 4, wherein:

a) said foldable seat assembly includes a container anchor member pivotally connected to a portion of said main toilet bowl and selectively connected to said seat support and drain assembly when in the expanded usage condition to anchor said foldable seat assembly to said main storage body assembly in a toilet usage condition.

6. A portable, collapsible, self-contained toilet apparatus as described in claim 1, wherein:

a) said foldable seat assembly includes a living hinge assembly interconnecting respective ones of said seat wing members to said main toilet bowl;

whereby said seat wing members are pivotal from a first collapsed position against opposed sides of said main storage body assembly in a folded condition to a second pivoted position inclined outwardly from said main toilet bowl in a usage condition.

7. A portable, collapsible, self-contained toilet apparatus as described in claim 6, wherein:

a) each of said living hinge members includes a seat anchor section secured to an adjacent one of said seat wing members, a first anchor section secured to said main toilet bowl, and an intermediate hinge section and a lateral support hinge section interconnecting said first anchor section to said seat anchor section;

whereby said intermediate hinge section forms a rigid support strut between said main toilet bowl and respective ones of said seat wing members.

8. A portable, collapsible, self-contained toilet apparatus as described in claim 7, wherein:

a) said lateral support hinge section having a portion engageable with said main toilet bowl to limit lateral movement thereof and connected to said intermediate hinge section to prevent downward movement thereof in the usage condition.

9. A portable, collapsible, self-contained toilet apparatus as described in claim 1, including:

a) an anchor strap assembly includes a main enclosure strap member connected to said foldable seat assembly and selectively mountable about said foldable seat assembly and said basic storage container assembly in a folded, collapsed condition for ease of conveyance and storage.

10. A portable, collapsible, self-contained toilet apparatus adapted to receive and convey waste products from an outdoor camping site for subsequent disposal at a sewer dumpster site, comprising:

a) a basic storage container assembly having a main storage body assembly adapted to receive, support, and convey waste products therein;

b) a foldable seat and anchor assembly mounted about and against said basic storage container assembly in a compact, space-saving manner;

c) said foldable seat and anchor assembly includes an anchor strap assembly mounted about said main storage body assembly to secure said foldable seat and anchor assembly to said main storage body assembly in a collapsed, folded condition for storage and conveyance purposes.

11. A portable, collapsible, self-contained toilet apparatus as described in claim 10, wherein:

a) said basic storage container assembly includes a seat support and flush assembly having a main support flange member and a seat enclosure cap member releasably connected to said main support flange member; and b) said seat enclosure cap member selectively removable from said main support flange member in order to interconnect said foldable seat and anchor assembly thereto in a toilet function usage condition.

12. A portable, collapsible, self-contained toilet apparatus as described in claim 11, wherein:

a) said basic storage container assembly includes a seat support and drain assembly connected to said foldable seat and anchor assembly in the usage condition.

13. A portable, collapsible, self-contained toilet apparatus as described in claim 11, wherein:

a) said seat support and flush assembly includes a valve member connected to said seat enclosure cap member; and b) said valve member operable to automatically release pressure build-up within said main storage body assembly.

14. A portable, collapsible, self-contained toilet apparatus as described in claim 10, wherein:

a) said foldable seat and anchor assembly includes a main toilet bowl having a pair of opposed foldable seat wing members pivotally connected thereto; and b) said seat wing members pivotal from a first storage position to a laterally extended inclined position substantially at an angle of 15 plus or minus 5 degrees relative to said main toilet bowl to achieve a size and inclination similar to a normal toilet seat assembly.

15. A portable, collapsible, self-contained toilet apparatus as described in claim 14 wherein:

a) respective ones of said seat wing members connected by a living hinge assembly to permit pivotal movement from the collapsed, foldable condition to the usage condition.

16. A portable, collapsible, self-contained toilet apparatus as described in claim 10, including:

a) a usage accessories assembly including a garden hose assembly and a dumpster hose assembly;

b) said garden hose assembly selectively connectable to said main storage body assembly to supply a cleansing fluid thereto; and c) said dumpster hose assembly selectively connected to said main storage body assembly to transfer the waste products combined with the cleansing fluid therefrom to a legal sanitary waste disposal site.

17. A portable, collapsible, self-contained toilet apparatus as described in claim 16, wherein:

a) said usage accessories assembly includes a toilet paper dispenser and a disinfectant/deodorant assembly used to be applied to said main storage body assembly after use in the toilet function usage condition; and b) said disinfectant/deodorant assembly releasably clamped to said basic storage container assembly when in the collapsed, folded condition.

18. A portable, collapsible, self-contained toilet apparatus adapted to be transported to remote camping locations to replace a conventional toilet bowl assembly in use and function, comprising:
   a) a basic storage container assembly including a main storage body assembly having 1) a seat support and flush assembly; and 2) a seat support and drain assembly connected thereto;
   b) a garden hose assembly selectively connected to a portion of said seat support and flush assembly to supply a cleansing fluid to an interior of said main storage body assembly; and
   c) a dumpster hose assembly selectively connected to a portion of said seat support and drain assembly to transfer the cleansing fluid and waste products in said main storage body assembly during a cleansing, flushing operation.

19. A portable, collapsible, self-contained toilet apparatus as described in claim 18, including:
   a) a foldable seat and anchor assembly having a main toilet bowl with a foldable seat wing assembly pivotally connected thereto and a container anchor member secured to said main toilet bowl; and
   b) said container anchor member selectively connected to said seat support and drain assembly when said foldable seat and anchor assembly is mounted on said main storage body assembly in a toilet function usage condition.

20. A portable, collapsible, self-contained toilet apparatus as described in claim 18, including:
   a) said seat support and flush assembly including a main support flange member having a seat enclosure cap member releasably connected thereto;
   b) said seat support and drain assembly having a support flange member with an enclosure support and plug member releasably connected thereto; and
   c) said seat support and flush assembly includes a plug and valve member connected to said seat enclosure cap member and operable with a pressure release valve to release pressure within said main storage body assembly on reaching an excessive pressure therein.

\* \* \* \* \*